March 26, 1940.  W. L. MAXSON ET AL  2,194,477
MULTIPLYING MACHINE
Filed Nov. 30, 1936  7 Sheets-Sheet 1

Fig.1.

INVENTORS.
William L Maxson and
Peter J. McLaren.
BY
ATTORNEYS

March 26, 1940.   W. L. MAXSON ET AL   2,194,477
MULTIPLYING MACHINE
Filed Nov. 30, 1936   7 Sheets-Sheet 2

INVENTORS.
William L. Maxson and
Peter J. McLaren.
BY

ATTORNEYS.

March 26, 1940.  W. L. MAXSON ET AL  2,194,477
MULTIPLYING MACHINE
Filed Nov. 30, 1936  7 Sheets-Sheet 3

INVENTORS
William L. Maxson and
Peter J. McLaren.
BY

ATTORNEYS

UNITED STATES PATENT OFFICE 2,194,477

MULTIPLYING MACHINE

William L. Maxson, South Orange, N. J., and Peter J. McLaren, New York, N. Y., assignors to The W. L. Maxson Corporation, New York, N. Y., a corporation of New York Application November 30, 1936, Serial No. 113,398

10 Claims. (Cl. 235—61)

This invention has to do with computing machines and more particularly with machines for multiplying numbers. It is adaptable, for example, for use in gasoline stations where the price to be charged a customer is computed by multiplying the price per gallon of gasoline by the number of gallons sold.

The primary object of the present invention is to provide a computing machine including revoluble multiplicand and multiplier input means, and registers directly responsive to the respective input means for showing the instantaneous values of the multiplicand and the multiplier as they change in value, together with product indicating means and transmission mechanism consisting exclusively of revoluble members whereby the multiplicand input means, the multiplier input means, and the product indicating means are geared together for causing the product indicating means, in response to the joint effect of the multiplier and multiplicand input means, to show the instantaneous values of the product continuously as the product changes in value.

The underlying principle of the computing mechanism of a preferred form of this invention is based upon two elementary formulas of algebra, namely, that the square of the sum of two quantities is equal to the sum of squares plus twice the product, and that the square of the difference of two quantities is equal to the sum of the squares minus twice the product. From these two results it is evident that if the square of the difference be subtracted from the square of the sum the remainder will be four times the product of the original quantities, and hence that by merely dividing the remainder by four the product of the two quantities will be revealed.

The present invention utilizes this principle of securing a product by providing means for separately running in and indicating the numbers to be multiplied. The operating members are both connected to two trains of mechanism. The connections are such that the quantities are combined additively in one train of mechanism and subtractively in the other train of mechanism. Each of these trains operates a squaring gear so that the output of one train is the square of the sum of the quantities and the output of the other is the square of the difference. These results are differentially combined by further gearing to operate an indicator to show one-quarter of their difference or, in other words, the true product of the original numbers. The division by 4 may, of course, occur at any point in the gear train or trains. If performed in advance of the squaring gears the division would be by 2 instead of 4.

It is desirable that the operator be not required to discriminate between the operating members as to which shall be used for the larger number and which for the smaller. In the train which deals with the sum of the numbers it would, of course, be immaterial which operating member runs in the larger number and which runs in the smaller number. In the other train, however, one of the numbers is added and one of the numbers is subtracted and if the operating members selected are such that the number subtracted is a larger number than the number added the difference would be negative. This situation is taken care of in accordance with the present invention by providing for a reversal of the driving train of the squaring gear at the zero point. With this provision the net result comes out right because the squares of the same absolute values whether positive or negative are the same.

A reversing mechanism is also provided in the additive train to take care of negative numbers.

In accordance with one embodiment of the invention three squaring gears are operated appropriately from the multiplicand and multiplier inputs so that their outputs are respectively the square of the multiplicand the square of the multiplier and the square of the sum of the multiplier and the multiplicand. The first two outputs are added together to secure the sum of the squares and this sum is then subtracted from the square of the sum of the multiplier and the multiplicand. The difference bears a known fixed relation to the product of the multiplier and multiplicand so that through appropriate gearing the product indicator may be caused to correctly show the product.

In another embodiment of the invention the necessity for reversing mechanism is obviated by starting the follower of one of the squaring gears, i. e., the gear which is turned in proportion to the difference of the multiplier and multiplicand, from a known position other than zero. Suitable compensation is provided, controlled by the magnitude of the difference of the multiplicand and the multiplier, to eliminate the effect of this false start upon the output.

In still another embodiment of the invention the followers of both the sum squaring gear and the difference squaring gear start from the same position other than zero, and suitable compensation is provided, controlled by the magnitude of the multiplier, for eliminating the effect of this false start.

Other objects and advantages will hereinafter appear.

The means for securing a non-linear output from a linear input is not claimed per se but is claimed in our divisional application Serial No. 276,280, filed May 29, 1939 for Functional apparatus.

In the drawings illustrating the principle and one preferred embodiment of the invention.

Before the parts are described in detail the major elements will be referred to for the purpose of following through the principle of the invention.

An operator, as handle 1, is turned to run the multiplicand into a counter 2. Through suitable gearing this forward rotation of the handle 1 runs a gear 3 of the sum train forward and also runs a gear 4 of a difference train forward. (The gear 4 is shown disconnected in Fig. 1, but it would be effective during the running in of a positive multiplicand.)

Figure 1:
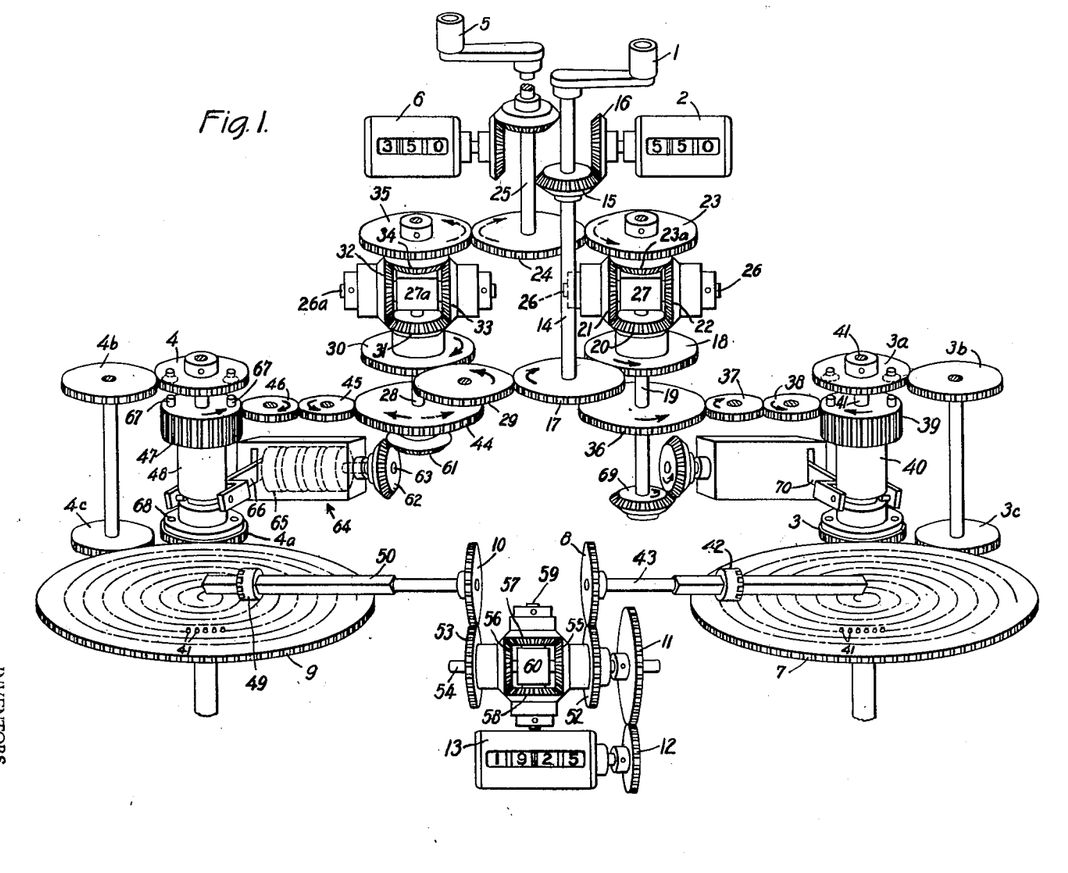
Fig. 1 is a fragmentary, perspective view illustrating the principal parts of the apparatus the reversing mechanism of the right hand train being shown in the positive position and the reversing mechanism of the left hand train being shown in the negative position.
Figure 2:
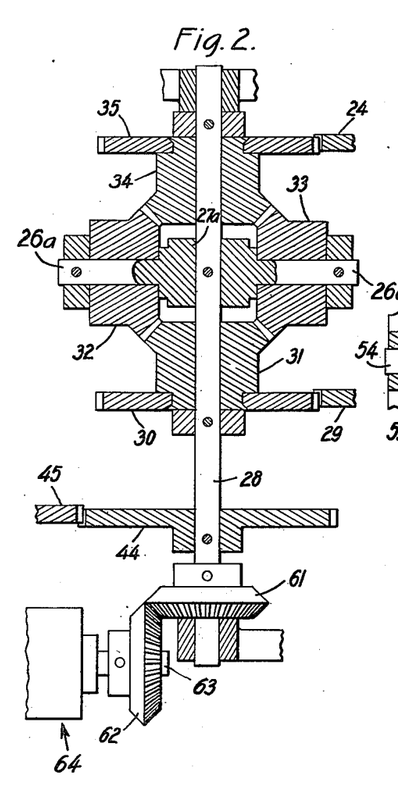
Fig. 2 is a fragmentary view in vertical section illustrating differential mechanism employed in the left hand train, which subtracts the numbers, the other train also including a similar differential mechanism.

A second operating handle 5 is turned forward to run the multiplier into a counter 6. This forward rotation of the operating member 5 acts through suitable gearing to run the gear 3 of the sum train forward and to run the gear 4 of the difference train backward.

The net result is that the gear 3 of the sum train is operated forward in proportion to the sum of the numbers indicated by the counters 2 and 6 and the gear 4 is operated forward in proportion to the difference of the numbers indicated by the counters 2 and 6. If the difference is negative, however, the gear 4 is thrown out of operation at zero and the gear 4a is made effective.

The gear 3 acts upon the squaring gear 7 to operate a gear 8 in proportion to the square of the sum of the numbers indicated by the counters 2 and 6, while the gear 4 acts through a squaring gear 9 to operate a gear 10 in proportion to the square of the difference of the numbers indicated by the counters 2 and 6. Through differential gearing these operations of the gears 8 and 10 are differentially combined to operate a gear 11 which, in turn, drives a gear 12 for rotating a product indicating counter 13. The counter 13 indicates one-quarter of the difference of the squares and hence the product of the numbers run into the counters 2 and 6.

The operating handle 1 is desirably fast upon a shaft 14 which carries a bevelled gear 15 which acts on a bevelled gear 16 for driving number wheels of the counter 2. The shaft 14 has fast upon it a gear 17 which meshes with a gear 18 loose upon a shaft 19. The gear 18 has fast with it a bevelled gear 20 which meshes with bevelled gears 21 a 22 of a differential train. A further gear 23 also loose upon the shaft 19 is driving from gears 21 and 22 through a bevel gear 23a. The gear 23 meshes with a gear 24 fast upon a shaft 25, the operating member 5 being fixed upon the shaft 25. Any suitable provision may be made for preventing retrograde rotation of the shafts 14 and 25 except at times when such rotation is desired for the purpose of setting the mechanism back to zero or of running in a number negatively. During the forward rotation of the operating member 1 the gear 24 may be assumed to be fixed. This prevents rotation of the gear 23 and hence compels the gears 21 and 22 to travel not only about their own axes but also about the axis of the shaft 19. The shafts 26 upon which the gears 21 and 22 are journalled are carried by a block 27 fixed to the shaft 19 so that the gears in travelling about the axis of the shaft cause the shaft to rotate. It will be seen that rotation of the operating handle 1 in a clockwise direction turns the gear 18 in a counter-clockwise direction and results in a turning of the shaft 19 in a counter-clockwise direction and in proportion to the turning of the gear 18.

When the gear 17 is held stationary and the gear 24 is turned clockwise by the operating handle 5, the gear 23 is turned counter-clockwise and this also results in turning the shaft 19 counter-clockwise and in proportion to the turning of the gear 24. The numbers run into the counters 2 and 6 are, therefore, additively combined in the rotation of the shaft 19.

The rotation of the operating handle 1 is also run positively into a shaft 28 similar to the shaft 19. Clockwise rotation of the gear 17 drives a meshing gear 29 counter-clockwise and this, in turn, drives a gear 30 loose on the shaft 28 in a clockwise direction. A bevelled pinion 31 fast with the gear 30 acts upon differential pinions 32 and 33 which mesh with a pinion 34. The pinion 34 is loose on the shaft 28 but is fixed to a gear 35 which meshes with the gear 24. Assuming that the gear 24 and hence the gear 35 is held against rotation while the handle 1 is turned forward, the clockwise rotation of the gear 30 results in a rotation of the shaft 28 in clockwise direction in proportion to the rotation of the gear 30.

When the gear 30 is held stationary, however, and the gear 24 is turned clockwise by operation of the member 5 the resulting counter-clockwise rotation of the gear 35 causes the shaft 28 to be turned counter-clockwise. As a result of this subtractive combining of the operating members 1 and 5 in their effect upon the shaft 28, the net rotation of the shaft 28 is proportional to the difference of the numbers indicated by the counters 2 and 6.

The shaft 19 has fast upon it a gear 36 which, through gears 37 and 38, drives a gear 39 fast on a clutch sleeve 40. The clutch sleeve 40 is rotatably mounted upon a shaft 41 which shaft carries the gear 3. Normally the clutch sleeve 40 drives the gear 3 which in turn drives the squaring gear 7.

The squaring gear 7 is a spiral gear having teeth 41 affixed to it so as to extend in a spiral path. The teeth 41 are uniformly spaced to mesh with and drive a crown gear 42 which is slidably mounted upon a square shaft 43. The spiral gear acts both to rotate the crown gear 42 and to move the crown gear along the shaft 43 toward and from the center of the spiral gear. As the crown gear moves away from the center of the spiral gear its rotation relative to the rotation of the gear 3 is increased, the shape of the spiral being so chosen that the rotation of the gear 42 is in proportion to the square of the rotation of the gear 3. The gear 8, which is fast upon the shaft 43 is, therefore, driven in proportion to the square of the rotation of the gear 3. Features of construction of the gears 7 and 9 will be described at a later point in this specification.

The other train of mechanism, in which the numbers are subtractively combined, comprises a gear 44 fast on the shaft 28 which, through similar mechanism, normally drives the gear 10 so that the rotation of the gear 10 is in proportion to the square of the rotation of the gear 4. This train of mechanism comprises gears 45 and 46, a gear 47 fast on a clutch sleeve 48, the gear 4, gears 4b and 4c, the squaring gear 9, a crown gear 49, and a square shaft 50, the gear 10 being fast upon the shaft 50. The clutch gears 39 and 47 are neutral at zero. They differ in the fact that the positive position of the gear 39 is down and the negative position is up, whereas the reverse condition holds true of gear 47.

The gears 8 and 10 are connected through differential mechanism to drive a gear 11 in opposite directions. Gears 8 and 10 mesh respectively with gears 52 and 53 (Figs. 1 and 3), both rotatably mounted upon a horizontal shaft 54. The gears 52 and 53, respectively, have fixed to them bevelled pinions 55 and 56, both of which pinions mesh with bevelled pinions 57 and 58. The pinions 57 and 58 are revolubly mounted upon a shaft 59 which comprises a central block portion 60 fixed to the shaft 54.

Figure 3:
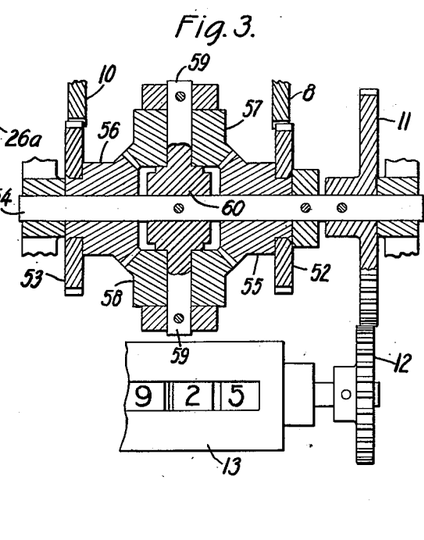
Fig. 3 is a fragmentary view in sectional elevation illustrating the differential mechanism for differentially combining the squares.
Figure 4:
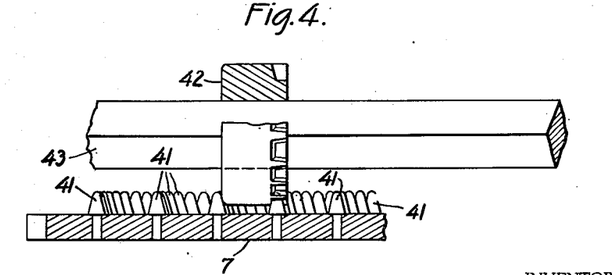
Fig. 4 is a fragmentary sectional detail view showing a portion of one of the squaring devices.
Figure 5:
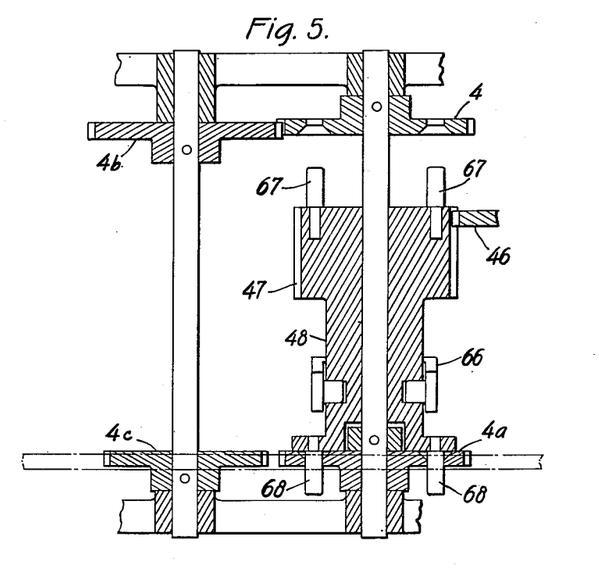
Fig. 5 is a fragmentary view in sectional elevation showing details of a reversing clutch.

The operation of a differential gear of this kind is well understood. When the gears 52 and 53 turn at the same speed in opposite directions, the pinions 57 and 58 merely turn about the axis of shaft 59 without causing the shaft to change its angular position relative to the axis of the shaft 54. When the gears 52 and 53 are turned at the same speed in the same direction they cause the shaft 54 to turn in unison with themselves. When one of the gears 52, 53 is turned and the other is held stationary, the shaft 54 is caused to turn in the same direction as the gear which is turning but at half the rotary speed of the gear. The simultaneous turning of the gears 52 and 53 at different speeds either in the same or opposite directions has the same effect on shaft 54 as if the same turning movements were applied to the two gears successively, each being held stationary while the other is being turned.

When a number is run into the counter 2 through the handle 1, the spiral gears 7 and 9 are turned in the direction to carry the crown gears 42 and 49 away from the centers of the spiral gears. This turns the bottom of the gear 10 away from the observer as seen in Fig. 1 and the bottom of the gear 8 toward the observer as seen in Fig. 1. The gears 52 and 53 are, therefore, operated in opposite directions so that the shaft 54, and hence the gears 11 and 12, remain stationary. The counter 13 therefore remains at zero. In the meantime if the number run into the counter 2 is called $a$, the crown gears 42 and 49 will both have been operated to positions on the spiral gears corresponding to $a^2$. If now a number $b$, which is less than $a$, is run in by the handle 5 the crown gear 42 will be moved further outward to a position corresponding to $(a+b)^2$. The additional rotation imparted to the gear 8 will be in a direction to drive the counter 13 forward and in an amount equal to $$\frac{(a+b)^2-a^2}{4}$$

and the additional rotation imparted to the gear 53 will be in a direction to drive the counter 13 forward and in an amount equal to $$\frac{a^2-(a-b)^2}{4}$$

The net result on the counter is obviously, therefore $$\frac{a^2+2ab+b^2-a^2}{4}+\frac{a^2+2ab-b^2-a^2}{4}$$

or $ab$.

The desired result having been indicated and utilized, the mechanism may all be set back to zero by turning the handles 1 and 5 backward until the counters 2 and 6 read zero.

Since the mechanism will frequently be employed, however, in a place like a gasoline filling station where the price of gasoline (the multiplicand) remains the same for a considerable time, there is no occasion nor necessity for setting the counter 2 back to zero at all. It may be left standing at the current price per gallon of gasoline. The normal positions of the gears 42 and 49 will then correspond to the square of this price, but the indicator 13 will read zero so long as the counter 6 reads zero. The handle 5 may be replaced by gearing connecting the shaft 25 to the gasoline pump through suitable clutch mechanism which causes the shaft 25 to be rotated forward in proportion to the amount of gasoline delivered but which permits the shaft to be uncoupled from the pump for setting back to zero. Suitable mechanical or electrical means, such as a spring motor or an electromagnetically operated pawl and ratchet mechanism, may be provided, if desired, for turning the shaft 25 to set the counters 6 and 13 back to zero upon the mere pressing of a button or trip by the operator.

While the above description has been on the assumption that the handle 1 is operated first, the apparatus operates in the same manner if the handle 5 is operated first. Starting from a condition in which all the counters stand at zero the only difference would be that the clutch 48 would shift to its negative or down position immediately upon the beginning of the operation. The spiral gear 49 would be operated away from the center as before so that at the conclusion of the turning of the handle 5 both of the crown gears 49 and 42 would stand at positions corresponding to the square of the number turned in. In view of the reverse connections as compared with the operation first described, the subsequent turning of the handle 1 would have precisely the same effect upon the gears 42 and 49, and the mechanism which they jointly control, as that described in the turning of the handle 5 after the handle 1.

While it is immaterial which handle is used for running in the larger number and also immaterial which handle is operated first, for the purpose of explaining the function and operation of the reversing mechanism it will be assumed first that both numbers are positive, that the smaller number is run in first by means of the handle 1, and that the operation is started with all counters standing at zero.

Immediately upon the beginning of the forward revolution of the handle 1 the clutch 48 is shifted up and the clutch 40 is shifted down by mechanism which will be described presently. As has already been explained the complete operation of the handle 1 will cause the gears 42 and 49 to stand at their positions corresponding to the square of the number run in by the handle 1. Now as the larger number is run in by the handle 5 the gear 42 continues to move out and takes up a position corresponding to $(a+b)^2$. So long as the clutch 48 remains down, gear 49 moves in toward the center of the spiral gear 9 until it reaches its original or zero position. At that point the clutch 48 is shifted upward so that the direction of drive of the spiral gear 9 is reversed. The gear 49 is, therefore, driven outward again from the center through the remainder of the operation and finally comes to rest at a position corresponding to $(a-b)^2$ which, of course, is the same position which would be occupied for $(b-a)^2$. Since the counter 13 always reflects the difference of position of the gears 42 and 49, the correct absolute value of the product will obviously be shown by the counter 13.

The mechanism may also be used for dealing with negative numbers and to this end the reversing clutch 40 is provided. The first effect of the backward turning of the handle 1 from zero will be to shift the clutch 40 to its upper position so that the gear 42 will be driven outward from the center of the spiral gear. From what has already been said with reference to the operating parts and with reference to the principle of operation it is thought that the manner in which the correct product is secured will be apparent and that a detailed analysis of the operation and of the principle of carrying it out will be unnecessary.

Briefly, however, the gear 42 always stands, when both handles 1 and 5 have been fully operated, at the position corresponding to the square of the algebraic sum of the quantities run in, and the gear 49 always stands at a position corresponding to the square of the algebraic difference of the quantities run in. The differential mechanism combines these operations so as to subtract the latter square from the former, and by a mere matter of gear ratios is caused to divide the difference by 4. The division, however, may, of course, occur farther back toward the source, and if it occurs in advance of the gears 7 and 9 the division will be by 2 instead of 4.

The reversing mechanism for the clutch 48 is driven from a bevel pinion 61 fast on the shaft 28. The pinion 61 drives a pinion 62 which is mounted on a drive shaft 63 of what may be an ordinary counter mechanism 64 of the Veeder type in which the number wheels can be operated in either direction. This mechanism is not intended to give an information to the operator so that the numbers may be omitted and the wheels may be entirely enclosed. In fact, the gearing alone is important. For the purpose of making the principle of the reversing mechanism clear, however, it may be assumed that it consists of a counter comprising a series of decimal number wheels in which the sight opening would be at the side facing the observer in Fig. 1. The highest denomination wheel 65 is outside the capacity of the apparatus. That is to say, if the apparatus is adapted to deal with numbers running into the hundreds, the wheel 65 will be a thousands denomination wheel. No amount of forward rotation of which will ever occur could influence or affect this wheel to carry it over from zero to 1. The counter would normally read if visible 0000. If the counter were turned backward one step from zero, however, there would be a carry over to all wheels and the counter would read 9999. If it then operated forward one step it would again read 0000. In other words, the wheel 65 operates from 0 to 9 when the counter goes backward from zero, and from 9 to 0 when the counter goes forward to zero. The wheel 65 has fixed upon it a clutch shifting fork 66 and from what has been said it will be apparent that the fork is shifted down when the counter 64 is operated backward from zero and is shifted up when the counter is operated forward to zero. The clutch includes pins 67 for engaging in recesses of the gear 4 and pins 68 for engaging in recesses of the gear 4a. Since the shift always occurs at exactly the same rotative position, alignment of the pins with the appropriate recesses is always assured.

The recesses are formed with flaring mouths to assist in guiding the pins. The pins enter the mouths of one set of recesses before leaving the mouths of the other set, so that faulty operation caused by overthrow or slight inaccuracies of timing is avoided.

The reversing mechanism for the clutch 40 may be substantially identical with the reversing mechanism for the clutch 48. This mechanism is driven from a pinion 69 fast on the shaft 19. The reversing mechanism may be assumed to be a counter exactly like the counter 64 but in which the sight opening would be on the side away from the observer in Fig. 1, so that if an observer went around to the far side and a sight opening were present he would see the units wheel at his right. As the device is viewed in Fig. 1, however, the units wheel is on the left and the direction of forward rotation is such that the tops of the wheels travel toward the observer. The wheel of highest denomination has fast upon it a clutch shifting fork 70. It will be apparent that the movement of the counter from 9999 to 0000 would carry the clutch fork 70 downward so that the down position is the positive position of the clutch 40. A change from 0000 to 9999 would carry the fork 70 upward so that the up position would be the negative position of the clutch 40.

The mechanism can obviously be used for division as well as for multiplication. This is done by first setting one of the counters 2 or 6, say 2, to show the known divisor, and then operating the other counter, 6, until the known dividend appears in counter 13. The quotient is then read from counter 6.

A description of the construction and design of the squaring gears 7 and 9 has been left for last in order to avoid digressing from the exposition of the principle of operation of the apparatus.

Figure 6:
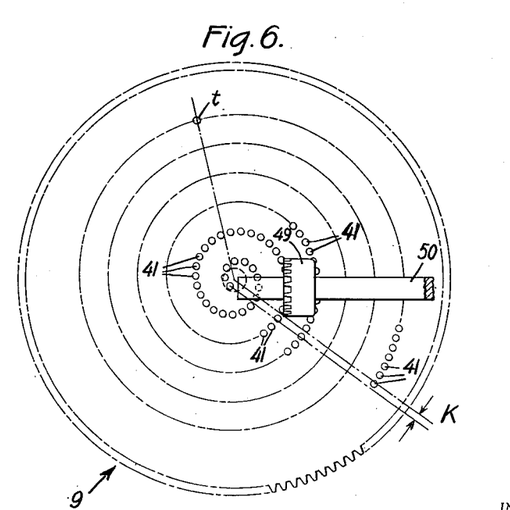
Fig. 6 is a fragmentary, diagrammatic, plan view showing a squaring gear and associated parts.

The gears 7 and 9 are alike so that a description of one of them will apply to either. The diagram of Fig. 6 is marked as representing the gear 9 but applies equally to the gear 7.

The primary requirement in constructing one of these gears is that the radius of the spiral shall increase in direct proportion to the angle through which the gear is turned from zero. This is necessary in order to make the output a function of the square of the input. The gear teeth 41 must, of course, be located at equal linear distances along the spiral gear since they are required to mesh with the uniformly spaced crown gear teeth.

The gear teeth 41 are individual elements in the form of studs set in holes drilled in the face of the gear 7.

A central tooth would be bodily immovable and, therefore, would be meaningless since it would not move transversely of the axis of the spur gear and hence would impart no drive to the spur gear. It would simply be in the way and would impose unnecessary dimensional limitations upon the spacing of the crown gear teeth and the spiral gear teeth. Hence no central tooth is provided.

Any arbitrary distance from the center not greater than one quarter of the radial distance between adjacent turns of the spiral might be selected for the innermost tooth of the spiral. The radius of this innermost tooth stands at right angles to the direction of the axis of the spur gear in the zero position, and the spur gear is driven exclusively by this single tooth, desirably during approximately the first quarter turn of the spiral. This results in an output of some small quantity. Since the spiral must have the characteristic that its radius increases in direct proportion to the angle of rotation from zero, it is evident that if the radius of the first tooth is called K and this tooth represents 1/4 turn, then the radius at 5/4 revolutions must be 5K—at 9/4 revolutions, 9K—at 13/4 revolutions, 13K, etc. In other words the distance K of the first tooth from the center is ¼ of the distance between adjacent turns of the spiral.

Since the distance between adjacent turns of the spiral is uniformly equal to 4K, the crown gear can be, and desirably is, made thick enough to be engaged and guided by the teeth of the spiral turn next outside the turn with which the crown gear is in mesh.

It is desirable that the output during the first ¼ turn shall approximate a square curve and that zero output shall occur at the zero position. During the first 90° of revolution the movement of the innermost tooth transversely of the axis of the shaft 43 is proportional to 1-cos $c$, (where $c$ is the angle of displacement from zero). Since $$1 - \cos c = 2 \sin^2 \frac{c}{2}$$

the movement of the first tooth transversely of the axis of the crown gear is proportional to the square of the sine of ½ the angle of displacement from zero. The sine of an angle does not depart greatly from a straight line function of the value of the angle between 0° and 45°. The transverse movement of the first tooth does not, therefore, depart greatly in value from the square of the angle of rotation of the spiral gear.

It is a fact, however, that the angle increases more rapidly than the sine, that is, the slope of a sine curve diminishes somewhat as the angle increases. It should be noted, however, that the spiral gear tooth moves in the plane of a chord of the crown gear. The angle of rotation of the crown gear, therefore, is not directly proportional to the movement of the first spiral gear tooth transversely of the crown gear axis. On the contrary, the shaft 43 and the crown gear have their axes so related to the axis of the spiral gear that the rotation of the crown gear in relation to the movement of the first spiral gear tooth transversely of the crown gear axis is the reciprocal of a sine curve. This relation has a corrective effect and tends to make the output, that is the rotation of the crown gear, more nearly proportional to the square of the angle of rotation of the spiral gear during the first 90° of turning.

The relationship referred to is secured by causing the axis of the crown gear to pass, not through the axis of the spiral gear, but at a distance from the axis of the spiral gear equal to K. Thus in the zero position the first tooth of the spiral gear stands in the axial vertical plane of the crown gear and as it moves across the crown gear it moves away from the central vertical plane.

This displacement of the crown gear axis relative to the axis of the spiral gear has another important advantage. While the teeth after the first tooth of the spiral gear travel in driving relation with the crown gear at both sides of its axial vertical plane, the driving travel on the left side of the vertical plane is relatively short as compared with the travel on the right side. Thus, assuming a uniform rate of rotation of the gear 7 the tendency of a pin is to accelerate the crown gear. This is particularly true because each spiral gear tooth of small radius moves into engagement with the crown gear through the face of the crown gear and with a substantial component of movement in the direction of the axis of the crown gear and a relatively slight component transversely of the crown gear axis, but leaves the crown gear through the periphery of the crown gear and at a time when the radius of the spiral gear tooth extends substantially parallel to the crown gear axis. The displacement of the crown gear axis has a further advantage in connection with the fact that the crown gear must at times be simultaneously engaged by two teeth of the spiral gear. The tooth of longer radius comes into engagement with the crown gear at a time when it has a substantial component of movement in the direction of the axis of the crown gear whereas the preceding tooth of shorter radius is at the same time moving more nearly at right angles to the axis of the crown gear. There is not, therefore, at any time any substantial disparity in the rates at which the two adjacent teeth tend to drive the crown gear.

For the purpose of constructing a spiral gear embodying the principle of the present invention the following formulas will be useful as a guide. Symbols used in the formulas have the following meanings:

P = diametral pitch of gear teeth.
T = total number of gear teeth.
$t$ = the number in the series of any specific tooth on the spiral pitch line, tooth No. 1 being nearest the center of the gear.
N = total number of revolutions of the gear.
R = radius of final tooth, i. e. the maximum radius of the spiral.
$r$ = radius of tooth $t$.
$c$ = angle of tooth $t$ from the zero point on the spiral gear.
K = offset of first tooth and of the axis of the crown gear shaft 43 from the center of the spiral gear.

In designing the spiral gear the first step is to assume desired values for N and R.

The mean radius of the spiral is $$\frac{R}{2}$$

The length of the spiral is $$\frac{2\pi NR}{2}$$

The number of teeth for any diametral pitch can be obtained by dividing this last quantity by $$\frac{\pi}{P}$$

$$\therefore T = \frac{2\pi NR/2}{\frac{\pi}{P}} = NRP$$

$$c = 360N\sqrt{\frac{t}{T}} \text{(since \% input} = \sqrt{\text{\% output})}$$

$$r = \frac{cR}{360N} = R\sqrt{\frac{t}{T}}$$

Since the first derivative of a square function is a straight line function, $r$ is proportional to the square root of $$\frac{t}{T}$$

$K = r$ for the first 90° of cam travel, therefore, $$K = \frac{90R}{360N} = \frac{R}{4N}$$

Figure 7:
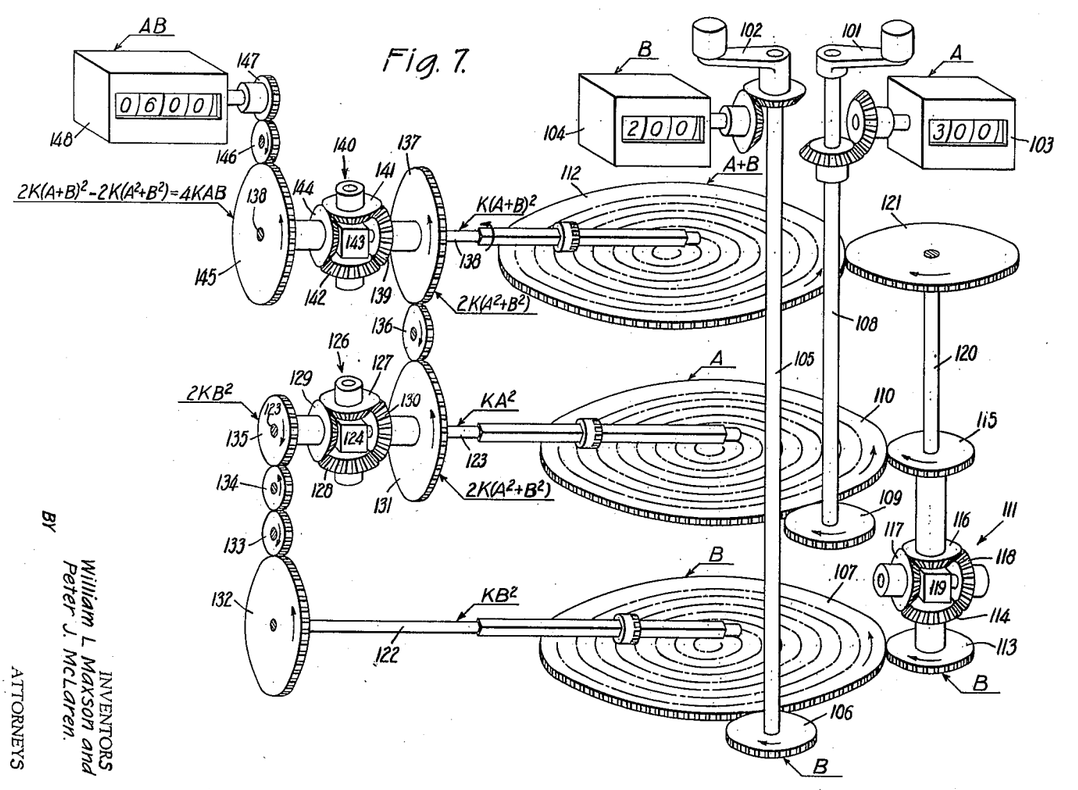
Fig. 7 is a perspective view, largely diagrammatic, illustrating a further embodiment of the invention.

In the embodiment of Fig. 7 operators 101 and 102 are provided for running the multiplicand into a counter 103 and the multiplier into a counter 104. The operator 102 acts directly through a shaft 105 and a gear 106 upon a squaring gear 107 so that the input of gear 107 is equal to the multiplicand B and the output is equal to $KB^2$ (K being a known constant). The operator 101 acts directly through a shaft 108 and a gear 109 upon a squaring gear 110 so that the input of the gear 110 is equal to the multiplier A and the output is equal to $KA^2$.

The shafts 105 and 108 are connected through differential gearing 111 to operate a squaring gear 112 in the same direction so that the input of the gear 112 is $A+B$ and the output is $K(A+B)^2$.

The gear 107 drives a gear 113 which is fast with a pinion 114 forming one element of the differential train while the gear 110 drives a gear 115 which is fast with a pinion 116 forming another element of the differential train. The pinions 114 and 116 mesh with pinions 117 and 118 which are carried by a spider 119 fast upon a shaft 120. Rotation of the gear 113 while the gear 116 is stationary results in a turning of the shaft 120 in the same direction as gear 113 but at one half the angular velocity. Similarly rotation of the pinion 116 while the pinion 114 is stationary results in rotation of the shaft 120 in the same direction as the pinion 116 but at one half the angular velocity. The reduction is compensated for by making output gear 121 of shaft 120 twice the diameter of the equal gears 113 and 115.

The output shafts 122 and 123 of gears 107 and 110 are connected so as to cause their outputs to be added. The shaft 123 has fast upon it a spider 124 forming one element of a differential gear 126. The spider carries pinions 127 and 128 both of which are constantly in mesh with pinions 129 and 130. When the pinion 129 is stationary and the spider is turned by the shaft 123 the output gear 131 is rotated in the same direction as the shaft 123 but at twice the angular velocity. The shaft 122 has fast upon it an output gear 132 which through two intermediate pinions 133 and 134 operates a gear 135. The gear 135 is fast with the pinion 129 but is rotatable upon the shaft 123. The gear 135 has a diameter equal to one half the diameter of the gear 132 so that the gear 135 has twice the angular velocity of the shaft 122. Rotation of the pinion 129 while the shaft 123 is stationary results in the turning of the gear 131 in the opposite direction to the gear 135 and at the same angular rate. Thus the combined effect of shafts 122 and 123 on the gear 131 is to cause the extent of operation of the gear 131 to be $2K(A^2+B^2)$.

The gear 131 is connected through a pinion 136 with a gear 137 of the same diameter as the gear 131. The gear 137 is rotatably mounted upon the output shaft 138 of the gear 112. It has fast with it a pinion 139 forming one element of a differential gear 140. The differential gear comprises pinions 141 and 142 carried by a spider 143 which is fast upon the shaft 138. The pinions 141 and 142 mesh with the pinion 139 and with a pinion 144. The pinion 144 is fast with an output gear 145. Rotation of the shaft 138 while the gear 137 is stationary results in rotation of the gear 145 in the same direction as the shaft 138 and at twice the angular rate. Thus the rotation of the shaft 137 through an angle corresponding to the value $K(A+B)^2$ results in a rotation of the gear 145 through an angle corresponding to $2K(A+B)^2$. Rotation of the gear 137 while the spider 143 is stationary results in rotation of the gear 145 in the opposite direction to the gear 137 and at the same angular rate so that rotation of the gear 137 through an angle corresponding to $2K(A^2+B^2)$ results in a rotation of the gear 145 through an angle corresponding to $-2K(A^2+B^2)$. The output of gear 145 is, therefore, equal to $$2K(A+B)^2 - 2K(A^2+B^2) \text{ or } 4KAB$$

Gears 146 and 147 for transmission of the output of gear 145 to a product indicator 147 are so chosen that the indicated product is equal to the output of gear 145 divided by 4K or AB.

Figure 8:
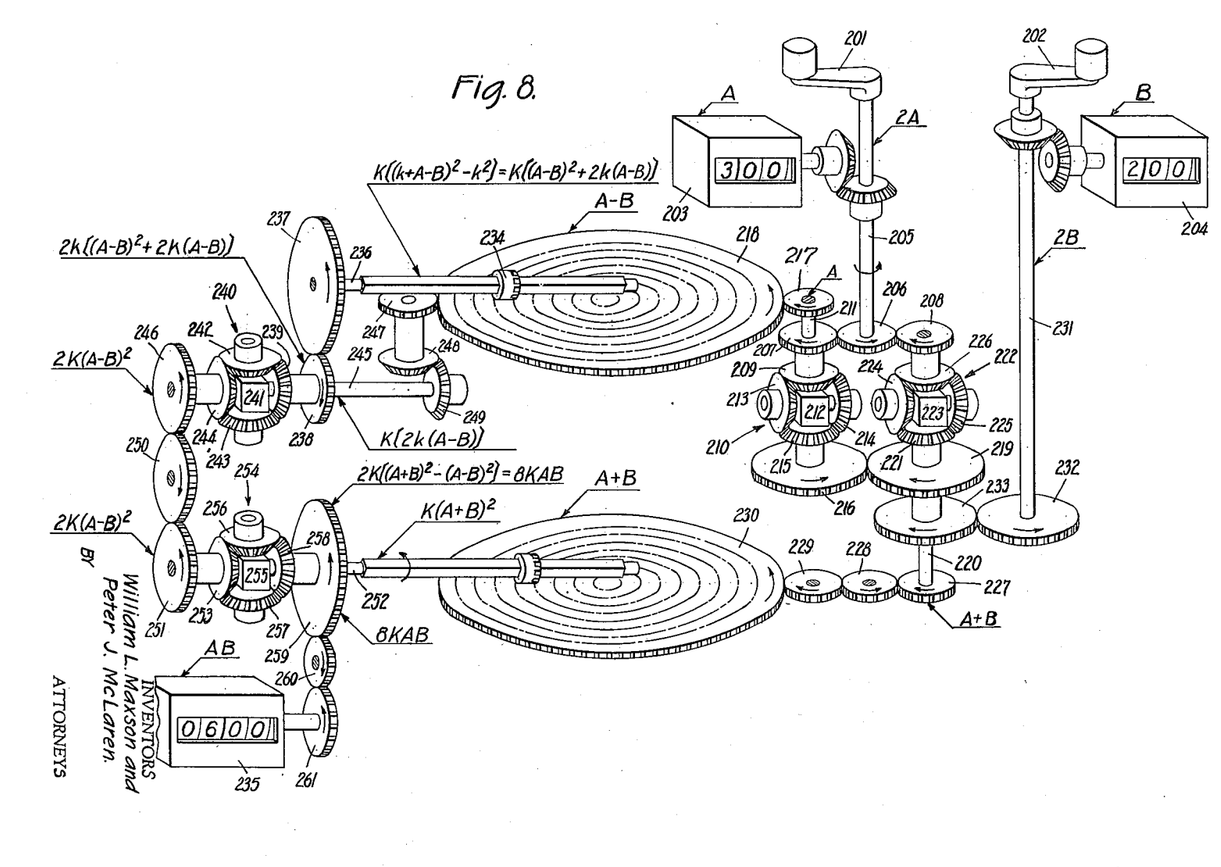
Fig. 8 is a view similar to Fig. 7 illustrating another embodiment.

In the form of the invention illustrated in Fig. 8 the multiplicand A is turned in by an operator 201 and the multiplier B is turned in by an operator 202. The multiplicand and the multiplier are indicated respectively upon counters 203 and 204. The multiplicand shaft 205 carries a gear 206 which drives gears 207 and 208. The gear 207 is fast with a pinion 209 forming the element of a differential gear 210. The gears 207 and 209 are rotatably mounted upon a shaft 211. A spider 212 is fast upon the shaft 211 and carries rotatable pinions 213 and 214. The pinions 213 and 214 mesh with a pinion 215 which is journalled on the shaft 211 and fast with a gear 216. When the gear 216 is stationary and the gear 207 is rotated the spider turns in the same direction as the gear 207 but one half as fast as the gear 207 so that if the rotation of the shaft 205 is represented by 2A the rotation of the shaft 211 will be represented by A. The shaft 211 has fast upon it a gear 217 which drives a squaring gear 218.

The gear 216 meshes with a gear 219 which is journalled upon a shaft 220 and which is fast with a pinion 221. The pinion 221 forms an element of a differential gear 222. The shaft 220 has fast upon it a spider 223 which carries pinions 224 and 225, both in mesh with a pinion 226 which is rotatably mounted upon the shaft 220 but which is fast with the gear 208. The rotation of the shaft 205 turns the pinion 226. At this time the pinion 221 is stationary and hence the shaft 220 is turned through the spider in the same direction as the gear 208 but at one half the angular speed so that, with an input of 2A from the shaft 205, the output of the shaft 220 will be A. The shaft 220 has fast upon it a gear 227 which through gears 228 and 229 operates a squaring gear 230. Operation of the handle 201 turns the gears 218 and 230 to the same extent and in the same direction.

The operator 202 is fast upon a shaft 231 which shaft has fast upon it a gear 232 in mesh with a gear 233. The gear 233 is fast with the gear 219 but revoluble upon the shaft 220. When the operator 202 is rotated forward the gear 216 is driven at the same angular rate as the shaft 231. Through the differential gearing 210, this results in rotation of the shaft 211 at one half the angular rate of the gear 216 but in the same direction as the gear 216. Since this direction of rotation, however, is opposite to that imparted to the gear 217 by operation of the handle 201 the resulting operation of the gear 218 will correspond to $-B$ so that the net result of operation of the two handles 201 and 202 upon gear 218 will correspond to $A-B$.

Rotation of the gear 219 will also act through the differential gearing 222 to turn the shaft 220 in the same direction as the gear 219 but through one half the angular distance. This is the same effect produced upon the shaft 220 by the forward turning of the operator 201 so that the net effect of the two operators 201 and 202 upon gear 230 will correspond to $A+B$.

In order to avoid the necessity for the reversing mechanism the follower 234 associated with the gear 218 is not started from the zero position but from a position on the gear track corresponding to $Kk^2$. With the follower in this position, both of the counters 203 and 204, and also the product indicating counter 235, stand at zero. The effect of using this starting position is to avoid the possibility of the need for reversing mechanism regardless of whether the larger or the smaller quantity is run in by the operator 202.

As a consequence of starting the follower 234 at the position $Kk^2$ the follower is caused to travel from this position to a position corresponding to $K(k+A-B)^2$ when $A-B$ is run into the gear 218. The output of the gear 218 to the shaft 236 is, therefore, $$K[(k+A-B)^2-k^2]$$

or $$K[(A-B)^2+2k(A-B)]$$

In order to get $K(A-B)^2$ from this output a quantity $K[2k(A-B)]$ must be subtracted from it. For the purpose of a subsequent combination of the difference with the output of gear 230, however, it is desirable that the subtrahend and the minuend be doubled so that the difference will be doubled.

The shaft 236 carries a gear 237 which drives a gear 238 having one-half the diameter of gear 237. The gear 238 is fast with a pinion 239 which forms an element of a differential gear 240. The differential gear also comprises a spider 241, pinions 242 and 243 carried by the spider, and an output pinion 244. Gear 238 and the pinions 239 and 244 are rotatable upon a shaft 245, and the spider 241 is fast upon the shaft 245. The output pinion 244 has a gear 246 fast with it.

Since the peripheral travel of the gear 218 is proportional to $A-B$ the rotation of shaft 245 may be made equal to $K[2k(A-B)]$ merely by the proper selection of gearing. The shaft 245 is, therefore, driven from the gear 218 through a gear train of appropriate design. The train is illustrated as comprising a gear 247 driven by the gear 218, a bevel pinion 248 fast with the gear 247, and a bevel pinion 249 fast on the shaft 245 and driven by the pinion 248.

The input to the differential gear 240 of gear 238 is $2K[(A-B)^2+2k(A-B)]$. Rotation of the pinion 239 in the direction indicated by the arrow while the spider is held stationary will result in an equal and opposite rotation of the gear 246. Rotation of the shaft 245 in the direction indicated by the arrow while the pinion 239 is stationary will result in operation of the gear 246 in the same direction as the shaft 245 but through twice the angular distance. Thus the input of gear 238 and twice the input of shaft 245 are subtractively combined to form the output of gear 246. The output of gear 246 is, accordingly, $2K(A-B)^2$.

The output of gear 246 is transmitted through a gear 250 to gear 251. The gear 251 is revolubly mounted upon the output shaft 252 of gear 230 and is fast with a pinion 253 which forms one element of a differential gear 254. The differential gear also comprises a spider 255 fast on the shaft 252, pinions 256 and 257 carried by the spider, and an output pinion 258 revolubly mounted upon the shaft 252. The pinion 258 has fast with it an output gear 259.

Rotation of the shaft 252 in the direction indicated by the arrow while the pinion 253 is held stationary results in rotation of the gear 259 in the same direction as the shaft 252 but through twice the angular distance, so that if the angular input of shaft 252 is $K(A+B)^2$ the revolution of gear 259 will be $2K(A+B)^2$. If the spider is held stationary while the gear 251 is rotated the gear 259 will be turned in the opposite direction to gear 251 but to the same angular extent as the gear so that the output will be $-2K(A-B)^2$ and this combined with the output caused by the rotation of the shaft 252 gives an output of 8KAB. The gear 259 is connected to the product indicating counter 235 through a suitable gear train, shown as comprising gears 260 and 261, for causing the factor 8K to be eliminated so that the product AB is indicated by the counter 235.

Figure 9:
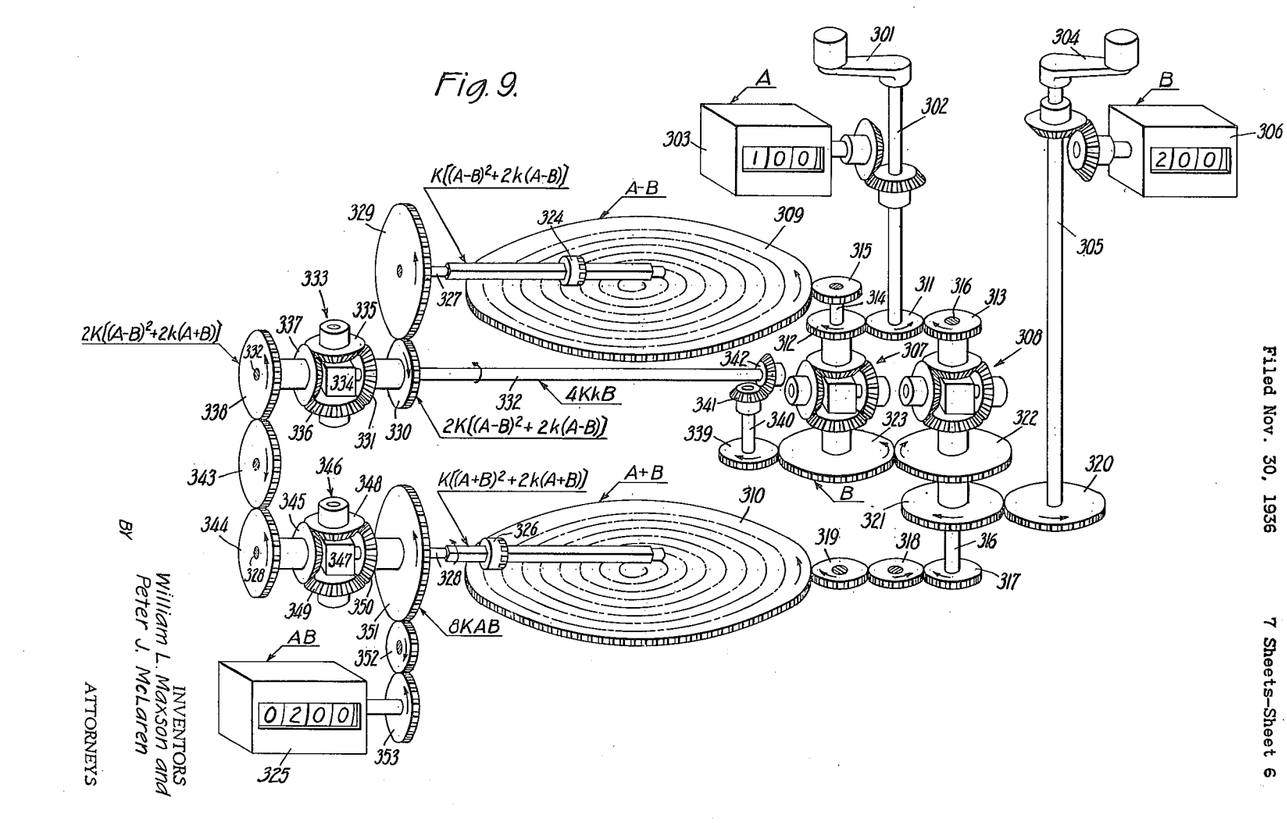
Fig. 9 is a view similar to Fig. 7 illustrating still another embodiment.

In the form of the invention disclosed in Fig. 9 both of the follower gears stand initially at the same position other than zero with respect to their associated squaring gears at the start and suitable compensation is provided for eliminating the error which would otherwise be produced by the false start. This form of device has the advantage that it is capable of handling either positive or negative inputs without the necessity of employing reversing mechanism.

An operating crank 301 mounted upon a shaft 302 is operated to run the multiplier into a counter 303, and an operating crank 304 mounted upon a shaft 305 is operated to run the multiplicand into a counter 306. Rotation of the crank 301 acts through differential trains 307 and 308 to run the multiplier A positively in the squaring gears 309 and 310. The input to the differential gears is from the shaft 302 through a pinion 311 and thence, respectively, through pinions 312 and 313. The output from the differential gear 307 is through a spider shaft 314 which is directly connected through a gear 315 to the gear 309. The output of differential gear 308 is through a spider shaft 316 which is connected through gears 317, 318 and 319 to drive the gear 310.

When the operator 304 is turned the input to differential gear 308 is through gears 320 and 321 the latter being revoluble upon the shaft 316. The input to differential gear 307 is through a gear 322 fast with the gear 321, and through a gear 323 revolubly mounted upon the spider shaft 314.

The follower 324 associated with the squaring gear 309 stands at a position corresponding to $Kk^2$ when the counters 303 and 306 stand at zero. At this time the product indicating counter 325 also stands at zero. The follower gear 326 stands at a position corresponding to $Kk^2$ on its squaring gear 310 at the time when the counters all stand at zero. When the gear 309 has been operated to the extent of $A-B$ the follower gear will have been moved from the position corresponding to $Kk^2$ to the position corresponding to $K(k+A-B)^2$ so that the output of the shaft 327 upon which the gear 324 is mounted will be proportional to the difference between the starting and final positions; that is, $$K[(k+A-B)^2-k^2]$$

or $$K[(A-B)^2+2k(A-B)]$$

Similarly, the output of shaft 328 upon which the follower gear 326 is mounted will be $$K[(A+B)^2+2k(A+B)]$$

Differentially combining these two outputs would yield as a result $4KAB-4KkB$. The first term is obviously wanted and the second unwanted. Provision is accordingly made for adding $4KkB$ to the output of shaft 327 and then subtracting the resulting sum from the output of shaft 328. The preceding sentence is correct in principle but is not quite accurate as related to the illustrative apparatus, for the reason, as will become apparent, that the output of 328 is multiplied by two and hence provision is made for multiplying the output of shaft 327 by two and for making the compensation twice as great as that stated above.

The shaft 327 has fast upon it a gear 329 which drives a gear 330 at twice its own angular speed. The gear 330 is fast with a pinion 331 and is revoluble upon a shaft 332. The pinion 331 forms one element of a differential gear 333. The differential gear also comprises a spider 334 fast upon the shaft 332, pinions 335 and 336 carried by the spider; and an output pinion 337 revoluble upon the shaft 332. The output pinion 337 has an output gear 338 fast with it.

The gear 323 which is driven only from the operator 304, and therefore in proportion to the quantity B, is connected through a gear 339 a shaft 340 and bevel pinions 341 and 342 to drive the shaft 332. Since the gear 323 is operated in proportion to the quantity B it is evident that the output of the shaft 332 may be made equal to $4KkB$ by appropriate selection of gearing.

When the shaft 332 is turned and the pinion 331 is idle, the gear 338 is driven in the same direction as the shaft 332 but through twice the angular distance so that the output is $8KkB$. When shaft 332 is stationary and the gear 330 is driven in the direction indicated by the arrow the gear 338 will be driven in the opposite direction but to the same extent as the gear 330 is driven. Both rotations of the gear 338 are in the same direction, so that the inputs are additively combined, and thus the output of gear 338 is caused to be $$2K[(A-B)^2+2k(A+B)]$$

This output is transmitted through gear 343 to a gear 344 which is revoluble upon the shaft 328 and fast with a pinion 345. The pinion 345 forms one element of a differential gear 346. The differential gear also comprises a spider 347 fast on the shaft 328, pinions 348 and 349 carried by the spider, and an output pinion 350 which is revoluble upon the shaft 328. The output pinion 350 has fast with it an output gear 351. When the shaft 328 is rotated in the direction indicated by the arrow the output gear 351 is rotated in the same direction and to twice the angular extent. When the gear 344 is rotated and the shaft 328 is stationary the gear 351 is rotated to the same angular extent as the gear 344 but in the opposite direction. Thus, the output of gear 344 is differentially combined with twice the output of shaft 328 giving as a result $8KAB$. The gear 351 is connected through a suitable gear train to operate the counter 325, the gears being so chosen that the factor $8K$ is eliminated and the counter 325 is caused to correctly indicate the product AB. The gear train is illustrated as comprising gears 352 and 353.

Figure 10:
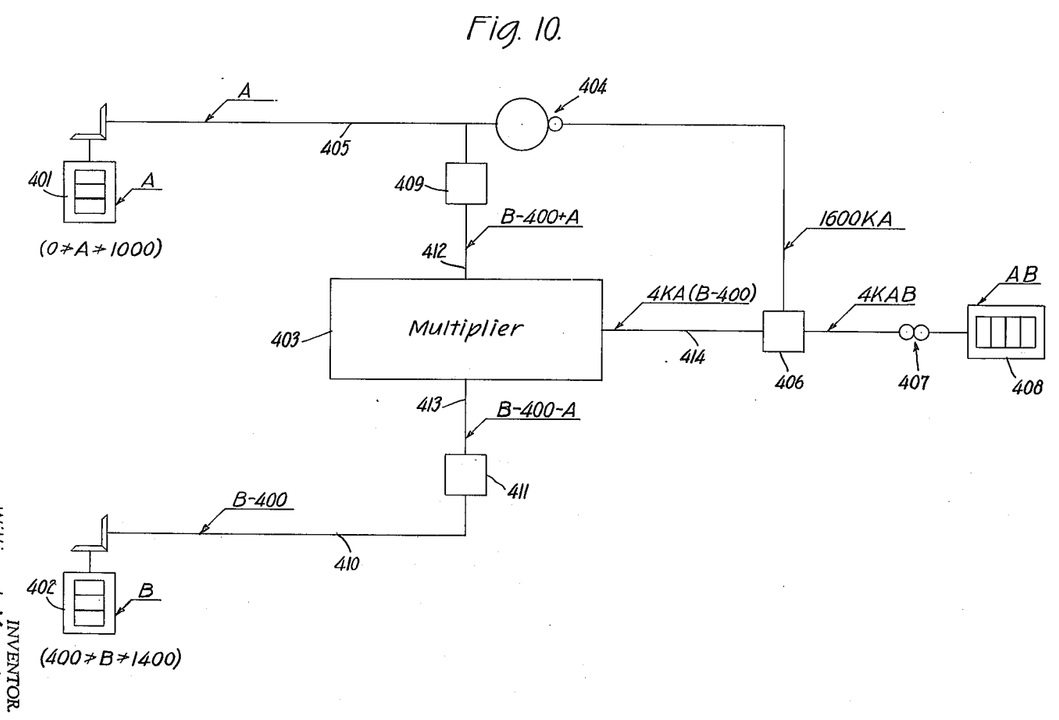
Fig. 10 is a purely diagrammatic view illustrating still another embodiment of the invention.

Fig. 10 is a diagrammatic view illustrating how a machine constructed in accordance with the principle of the machine in Fig. 1 may be utilized to advantage where one of the quantities to be multiplied is known to have a minimum limit other than zero. In this figure the A counter, 401, is indicated as covering a range from zero to 1000, and a B counter, 402, is indicated as covering a range from 400 to 1400. When the A counter is at zero and the B counter is at 400 the followers of both squaring gears stand at zero. The input to one side of the multiplier is A and the input to the other side is $B-400$. One of the squaring gears of the multiplier 403 has an input of $B-400+A$ and an output of $(B-400+A)^2$, while the other has an input of $B-400-A$ and an output of $(B-400-A)^2$. The difference of the outputs is $4A(B-400)$. It is apparent that the desired product AB can be obtained from this formulae by adding 1600A and then dividing the sum by 4. Provision is accordingly made of gearing 404, operated from the A train 405, to produce an output of 1600A which, through differential gearing 406, is added to the output of the multiplier 403 to produce an output $4AB$. The factor 4 is eliminated through transmission gearing 407, with the result that the product indicating counter 408 is caused to indicate the product AB correctly. In the diagram the input from the A operator is indicated as transmitted by a train 405 to differential gearing 409, and the input from the B operator is indicated as transmitted by train 410 to differential gearing 411. The differential gears are combined, in fact, as in Fig. 1. The gearing for operating the gear that squares the sum is indicated by the line 412, and the gearing for operating the gear that squares the difference is indicated at 413. The output gearing of the multiplier, after the squares of the sum and the difference have been combined, is indicated at 414.

We have described what we believe to be the best embodiments of our invention. We do not wish, however, to be confined to the embodiments shown, but what we desire to cover by Letters Patent is set forth in the appended claims.

We claim:

1. In a multiplying machine, in combination, means for running in a multiplicand, means for running in a multiplier, operating trains effective respectively to combine the multipler and the multiplicand additively and subtractively, means including flat spiral squaring gears operable respectively in proportion to the sum and the difference of the multiplier and the multiplicand, means comprising crown gears operable by the respective spiral gears in proportion to the square of the sum and the square of the difference of the multiplier and multiplicand, and means operable in proportion to the difference of operation of the last mentioned means to indicate the product.

2. In a multiplying machine, in combination, means for running in a multiplicand, means for running in a multiplier, a train operable in proportion to the sum of the multiplicand and the multiplier, a train operable in proportion to the difference of the multiplicand and the multiplier, gearing including a flat spiral gear operable by the first train for producing an output in proportion to the square of the sum, gearing including a flat spiral gear operable by the second train for producing an output in proportion to the square of the difference, a product indicator, and means operating said indicator in proportion to the difference of the outputs of said gearings.

3. In a multiplying machine, means for running in a multiplicand and a multiplier, a pair of output devices responsive to the running in of the multiplicand and the multiplier, one including means for producing an output proportional to the square of the sum of the multiplier and the multiplicand and the other including means for producing an output proportional to the square of the difference of the multiplier and muliplicand, a product indicator, and indicator operating means responsive to said output devices to combine the outputs differentially so that the indicator remains idle during operation of the output devices in unison but operates proportionally to any difference of operation of the two output devices.

4. In a multiplying machine for obtaining the product of two numbers from the difference of the squares of their sum and difference, in combination, means for separately running in the numbers, a sum train responsive to the running in of the numbers and including means for producing an output proportional to the sum of the numbers, a difference train responsive to the running in of the numbers and including means for producing an output proportional to the difference of the numbers, squaring gears operated respectively by the sum and difference trains and means including a control device operated by the difference train for reversing the direction of drive of the difference train output when the total operation of the difference train passes through zero.

5. In a multiplying machine for obtaining the product of two numbers from the difference of the squares of their sum and difference, in combination, means for separately running in the numbers, a sum train connected to be similarly responsive to the running in of the numbers and including means for producing an output proportional to the sum of the numbers, a difference train connected to be oppositely responsive to the running in of the numbers and including means for producing an output proportional to the difference of the numbers, squaring gears operated respectively by the sum and difference trains, and means including a control device operated by the diffeernce train for reversing the drive of either train upon the total operation of the difference train passing through zero.

6. In a multiplying machine, the combination with two squaring gears, of associated follower gears, one of which starts from zero and the other of which starts from a predetermined point other than zero, means for running in the multiplicand and the multiplier, and means including multiplying gearing controlled by the magnitude of the difference between the multiplicand and the multiplier for producing an output which is a linear function of such difference, and differential gearing for combining such output with the outputs of the squaring gears, to compensate for the fact that one of the squaring gear followers did not start from zero.

7. In a multiplying machine, the combination with two squaring gears, of associated follower gears both of which start from the same predetermined position other than zero, means for running in the multiplicand and the multiplier, and means including multiplying gearing controlled by the magnitude of the multiplier for producing an output which is a linear function of the multiplier, the differential gearing for combining such output with the outputs of the squaring gears to compensate for the fact that the squaring gear followers did not start from zero.

8. A computing machine comprising, in combination, input means whose input may be either positive or negative, a squaring gear, output means driven by the squaring gear in proportion to the square of the input, a driving train from the input means to the squaring gear, including alternative connections between the input means and the squaring gear of opposite effect for changing the relative direction of the drive, and means including a control device operated by the driving train connections each time that the net value of the input passes through zero, whereby the squaring gear is caused always to be operated in a positive direction in proportion to the departure of the input value from zero, and the output of the squaring gear is caused always to be positive regardless of the sign of the input.

9. A computing machine as set forth in claim 8 in which the control device comprises a clutch member shiftable between the alternative driving connections, denomination gears and carry-over gears operable directly by the driving train in either direction, and a clutch shifting member carried by the gear of highest denomination, the gear of highest denomination being outside the capacity of the machine and, therefore, operable only when the driving train pases through zero.

10. A computing machine having, in combination, revoluble multiplicand input means, register means directly responsive to said input means for showing the instantaneous values of the multiplicand as it changes in value, revoluble multiplier input means, register means directly responsive to said input means for showing the instantaneous values of the multiplier as it changes in value, product indicating means, and transmission mechanism consisting exclusively of revoluble members whereby the multiplicand input means, the multiplier input means, and the product indicating means are geared together for causing the product indicating means, in response to the joint effect of the multiplier and multiplicand input means to show the instantaneous values of the product continuously as the product changes in value.

WILLIAM L. MAXSON.
PETER J. McLAREN.

CERTIFICATE OF CORRECTION.

Patent No. 2,194,477.                                                 March 26, 1940.

WILLIAM L. MAXSON, ET AL.

It is hereby certified that error appears in the printed specification of the above numbered patent requiring correction as follows: Page 9, second column, line 39, claim 7, for "the differential" read and differential; and that the said Letters Patent should be read with this correction therein that the same may conform to the record of the case in the Patent Office.

Signed and sealed this 30th day of April, A. D. 1940.

(Seal)

Henry Van Arsdale,
Acting Commissioner of Patents.

CERTIFICATE OF CORRECTION.

Patent No. 2,194,477. March 26, 1940.

WILLIAM L. MAXSON, ET AL.

It is hereby certified that error appears in the printed specification of the above numbered patent requiring correction as follows: Page 9, second column, line 39, claim 7, for "the differential" read and differential; and that the said Letters Patent should be read with this correction therein that the same may conform to the record of the case in the Patent Office.

Signed and sealed this 30th day of April, A. D. 1940.

(Seal)

Henry Van Arsdale,
Acting Commissioner of Patents.